(12) United States Patent
Perez et al.

(10) Patent No.: US 10,089,808 B2
(45) Date of Patent: Oct. 2, 2018

(54) MOBILE LOCKER BANK SYSTEMS AND METHODS

(71) Applicant: United Parcel Service of America, Inc., Atlanta, GA (US)

(72) Inventors: Juan Perez, Milton, GA (US); Robert J. Gillen, Johns Creek, GA (US); Kalin Robinson, Johns Creek, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 15/608,781

(22) Filed: May 30, 2017

(65) Prior Publication Data

US 2018/0190054 A1    Jul. 5, 2018

Related U.S. Application Data

(60) Provisional application No. 62/440,456, filed on Dec. 30, 2016.

(51) Int. Cl.
*G07C 9/00* (2006.01)
*G06Q 10/08* (2012.01)

(52) U.S. Cl.
CPC ..... *G07C 9/00309* (2013.01); *G06Q 10/0836* (2013.01); *G07C 9/00166* (2013.01); *G07C 9/00912* (2013.01); *G07C 2009/00769* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 2004/0177008 A1* | 9/2004 | Yang | G06Q 10/08 705/26.1 |
| 2015/0106296 A1* | 4/2015 | Robinson | G06F 21/62 705/339 |
| 2015/0186840 A1* | 7/2015 | Torres | A47B 81/00 705/339 |

* cited by examiner

*Primary Examiner* — Leon-Viet Nguyen
(74) *Attorney, Agent, or Firm* — Shook, Hardy & Bacon LLP

(57) ABSTRACT

A locker bank system for expanding the capacity of a fixed locker bank having monitors when the number of available lockers drops below a predefined threshold capacity at the fixed locker bank. In response to this trigger, a mobile locker bank is automatically routed to the fixed locker bank to increase a number of available lockers at the location. A computing system at the fixed locker bank and the mobile locker bank are adapted to control access to the fixed and mobile locker bank lockers. Each locker bank further includes a communication system that is adapted to facilitate direct or indirect communication between the fixed locker bank computing system and the mobile locker bank computing system when the mobile locker bank is positioned adjacent the location of the fixed locker bank. Together the fixed locker bank and the mobile locker bank may function as a unitary locker bank.

41 Claims, 7 Drawing Sheets

MOBILE LOCKER BANK SYSTEMS AND METHODS

CROSS-REFERENCE TO RELATED APPLICATIONS

This application claims the benefit under 35 U.S.C § 119(e) of U.S. Application No. 62/440,456 filed Dec. 30, 2016, which is incorporated herein by reference.

BACKGROUND

Fixed locker bank systems have a finite number of lockers. If all of the lockers within the fixed locker bank are housing items, users must wait for a locker to become available before using the locker bank. Accordingly, there is a need for improved systems and processes for dynamically expanding capacity at fixed locker banks.

SUMMARY OF THE VARIOUS EMBODIMENTS

A locker bank system, according to particular embodiments comprises a first fixed-position locker bank positioned at a second location, a mobile locker bank, and a communications systems adapted to facilitate communications between a first computing system and a second computing system when the mobile locker bank is positioned at the second location so that the first fixed-position locker bank and the mobile locker bank functions as a single, combined locker bank. The first fixed-position locker bank comprises a plurality of fixed-position locker bank lockers. Each of the fixed-position locker bank lockers comprise a housing defining: (1) an interior storage portion that is accessible through an opening in the housing; (2) a door that is moveably mounted to the housing and moveable between (a) a first position, in which the door is positioned to prevent access to the interior storage portion through the opening, and (b) a second position, in which the door is positioned to permit access to the interior storage portion through the opening. The first fixed-position locker bank further comprises a locking system that is adapted to, for each respective one of the plurality of lockers of the fixed-position locker bank, selectively lock the respective locker's door in the first position. The first fixed-position locker bank also comprises a first computing system, which comprises: (1) at least one first computer processor; (2) a first memory operatively coupled to the at least one first computer processor; and (3) a first user interface operatively coupled to the at least one first computer processor. The first user interface is adapted for receiving information from, and communicating information to, a user. The first computing system is adapted to control access to the respective interior storage portions of the plurality of fixed-position locker bank lockers based on input received via the first user interface. The mobile locker bank comprises a plurality of mobile locker bank lockers, each of which comprise a locker housing defining: (1) an interior item storage portion that is accessible through an opening in the locker housing; (2) a locker door that is moveably mounted to the locker housing and is moveable between: (a) a first position, in which the locker door is positioned to prevent access to the locker housing's interior item storage portion through the opening in the locker housing, and (b) a second position, in which the locker door is positioned to permit access to the interior item storage portion through the opening in the locker housing. The mobile locker bank further comprises a mobile locker locking system that is adapted to, for each respective one of the plurality of lockers of the mobile locker bank, selectively lock the respective locker's door in the first position. The mobile locker bank also comprises a second computing system that comprises at least one second computer processor and second memory operatively coupled to the at least one second computer processor. The second computing system is adapted to control access to the respective interior storage portions of the mobile locker bank lockers.

According to various embodiments, a locker bank system comprises a first fixed-position locker bank positioned at a first location, a mobile locker bank, and a communications system that is adapted to facilitate communications between the first computing system and the second computing system so that, when the mobile locker bank is positioned at the first location, the first fixed-position locker bank and the mobile locker bank cooperate to function as a single locker bank. The first fixed-position locker bank comprises: (1) a plurality of first fixed-position locker bank lockers, each first fixed-position locker bank locker comprising a compartment having an opening and a door mounted to the compartment that is moveable between a first open position and a second closed position to prevent access to the compartment through the opening; (2) a first locking system that is adapted to, for each respective one of the plurality of lockers of the first fixed-position locker bank, selectively lock the respective locker's door in the closed position; and (3) a first computing system. The first computing system comprises: (1) a first at least one computer processor; (2) first memory operatively coupled to the first at least one computer processor; and (3) a first user interface for receiving information from, and communicating to, a user. The first computing system is adapted to control access to each respective compartment of the first fixed-position locker bank plurality of lockers based on input received via the first user interface. The mobile locker bank comprises a plurality of mobile locker bank lockers, each of the mobile locker bank lockers comprising a compartment having an opening and a door mounted to the compartment that is moveable between a first open position and a second closed position to prevent access to the compartment through the opening. The mobile locker bank also comprises a mobile locker bank locking system that is adapted to, for each respective one of the plurality of lockers of the mobile locker bank, selectively lock the respective locker's door in the closed position. Further, the mobile locker bank comprises a plurality of wheels that are operatively connected to the mobile locker bank to facilitate movement of the mobile locker bank between the first location and a second location. The mobile locker bank further comprises a second computing system comprising a second at least one computer processor and memory operatively coupled to the second at least one computer processor. The second computing system is adapted to control access to each respective compartment of the mobile locker bank plurality of lockers.

In various embodiments, a mobile locker bank expansion system comprises a mobile locker bank. The mobile locker bank comprises: (1) a first plurality of lockers; (2) a first locking system; (3) a plurality of wheels; (4) a first computing system; and (5) a first communication system. Each of the lockers of the first plurality of lockers comprises a locker housing defining: (1) an interior storage portion that is accessible through an opening in the locker housing; and (2) a locker door that is mounted to move between: (a) a closed position, in which the locker door is positioned to prevent access to the locker housing's interior storage portion through the opening in the locker housing, and (b) an open position, in which the locker door is positioned to permit access to the interior storage portion through the opening in the locker housing. The first locking system is adapted to, for each particular one of the first plurality of lockers, selectively lock the particular locker's door in the closed position. The plurality of wheels are operatively connected to the mobile locker bank for facilitating movement of the mobile locker bank from a first location to a second location. The first computing system comprises at least one computer processor and memory operatively coupled to the at least one computer processor, the computing system being adapted to control access to the respective interior storage portions of each of the first plurality of lockers via the locking system. The first communication system is operatively coupled to the first computing system. When the mobile locker bank is positioned at a first location at which a first fixed-position locker bank is located, the first fixed-position locker bank having a second plurality of lockers and a second computing system, the communication system is adapted to allow the first computing system to either directly or indirectly communicate with the second computing system so that the first plurality of lockers and the second plurality of lockers function as a single plurality of lockers.

According to various embodiments, a method of selectively expanding the inventory of a fixed-position locker bank comprises: (1) monitoring the number of available lockers at a first fixed-position locker bank positioned at a first location; (2) in response to determining that the number of available lockers at the first fixed-position locker has or will drop below a first predetermined threshold level, routing a mobile locker bank to the first location; and (3) facilitating communication between the mobile locker bank and the first fixed-position locker bank when the mobile locker bank is at the first location so that users may access a locker of the mobile locker bank via a user interface on the first fixed-position locker bank.

In various embodiments, a method of selectively expanding the inventory of a fixed-position locker bank is provided that includes determining at computing devices a number of parcels that shall be delivered to a first fixed-position locker bank at a first location over a time period. With the computing devices, a number of available lockers is monitored at the first fixed-position locker bank positioned at the first location. In response to determining the number of parcels to be delivered and monitoring the number of available lockers at the first fixed-position locker bank, an amount of lockers needed to hold all is calculated. If the amount of lockers exceed a total number of lockers at the first fixed-position locker bank, a mobile locker bank is routed to the first location. Communication between the mobile locker bank and the first fixed-position locker bank is facilitated when the mobile locker bank is at the first location so that users may access a locker of the mobile locker bank via a user interface on the first fixed-position locker bank.

BRIEF DESCRIPTION OF THE DRAWINGS

Various embodiments of a system and method for expanding the capacity of a locker bank using a mobile locker bank are described below. In the course of this description, reference will be made to the accompanying drawings, which are not necessarily drawn to scale, and wherein.

DETAILED DESCRIPTION OF VARIOUS EMBODIMENTS

Figure 1:
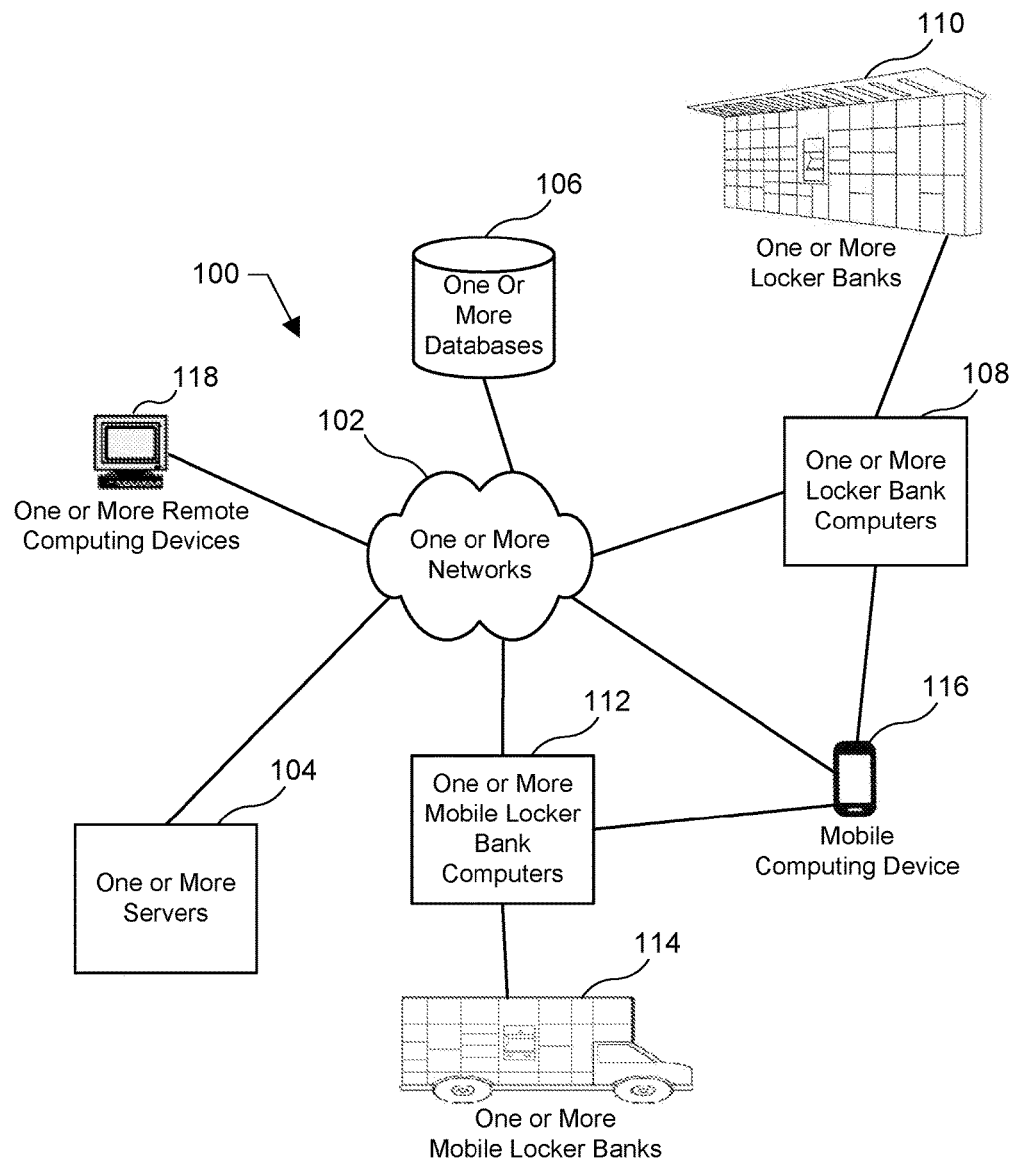
FIG. 1 is a block diagram of a locker system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In particular embodiments, a mobile locker bank system is adapted for expanding capacity of a fixed locker bank at a location by directing one or more mobile locker banks to the first location in order to provide additional lockers. In various embodiments, the system may determine that the number of available lockers at the fixed locker bank has dropped or is forecasted to drop below a particular threshold number of available lockers. In response, the system may determine that the fixed locker bank needs a temporary expansion unit (e.g., a mobile locker bank having a plurality of lockers). The expansion unit may be in the form of a mobile locker bank that is either towed or driven to the location where the fixed locker bank is located. The expansion unit is temporary to aid the capacity needs at the fixed locker bank until the additional lockers are no longer needed.

Upon arrival of the mobile locker bank to the location of the fixed locker bank, an individual and/or the system may facilitate a connection between the fixed locker bank and the mobile locker bank. The connection may include facilitating an electronic wireless communication connection and/or a physical wired connection. The communication connection may allow the computing system of the fixed locker bank to communicate either directly or indirectly with the computing system of the mobile locker bank, and allow each to communicate with mobile computing devices (e.g. Tablet computer, smartphone, laptop computer) and remote servers (e.g. a remote logistics server). The communication connection may also allow the fixed locker bank computer to control access to the lockers of the mobile locker bank or vice versa. The physical connection may include connecting the mobile locker bank to the fixed locker bank by an electrical cable, other mechanical coupling device and/or to a structure or other electronic connections at the location where the fixed locker bank is positioned. For example, the location where the fixed locker bank is located may include mounting devices for securing the additional mobile locker bank and providing power and a communication channel to the mobile locker bank. For example, when the mobile locker bank is towable, the mobile locker bank may be secured to the fixed locker bank.

Once the mobile locker bank has been connected to the fixed locker bank, the system may treat the lockers of the mobile locker bank as an extension of the available lockers of the fixed locker bank. For example, users desiring to deposit an item into the locker bank may use a computer of the fixed locker bank or the mobile locker bank to access a locker within either the fixed locker bank or the mobile locker bank. In some embodiments, the system may require the user to use a computer associated with the fixed locker bank to gain access to a locker within the mobile locker bank. In other embodiments, users may also retrieve items from either the fixed locker bank or the mobile locker bank using either the fixed locker bank computer or the mobile locker bank computer.

Given the description above for the fixed locker bank and the mobile locker bank, another embodiment may be implemented where no locker bank exists. In such case, one or more mobile locker banks may be located in an area where there is no fixed locker bank. This situation can occur where there is a need for a locker bank location to facilitate the needs of users. The mobile locker bank can be used to reduce capacity demands that might exist for fixed locker banks that are located elsewhere, but not nearby or in proximity to the location where no locker bank exists. Alternatively, the mobile locker bank may be positioned at different locations for a designated period of time to assess possible locations for a fixed locker bank. One or more locker banks can be towed or driven to a location. For example, during a busy holiday period or other time, one or more mobile locker banks can be towed or driven to a parking lot and positioned temporarily in the area. In the event more than one locker bank is positioned at a location, a connection may be made between the mobile locker banks. As with a connection between a fixed locker bank and a mobile locker bank, a same connection can be made between the two or more mobile locker banks where a computer of one mobile locker bank can be used to control access to all the mobile locker banks connected together at the location. This control can include gaining access to as well as locking the lockers in the connected two or more mobile locker banks.

In some embodiments, a mobile locker bank may be pre-loaded with packages bound for consignees in a predetermined geographic area (e.g., a neighborhood, proximate distance from anticipated parking location for the mobile locker bank). In some embodiments, a driver and/or agents may be dispatched to retrieve packages from the mobile locker bank and deliver packages to their associated destination addresses. The personnel may be provided an access code to gain access to one or more lockers in the locker bank. U.S. patent application Ser. No. 14/514,276, which was filed on Oct. 14, 2014 and entitled "Systems and Methods for Confirming an Identity of an Individual, for example, at a Locker Bank", which is hereby incorporated herein by reference in its entirety, describes a driver access method that may be used in connection with this embodiment.

In some embodiments, specific lockers may contain multiple packages addressed to multiple different addresses/consignees. Accordingly, the driver and/or agent may gain access to a locker, retrieve at least a portion of the packages therein and deliver the packages to the associated delivery addresses/consignees. In further embodiments, the consignee may be sent notifications indicating the location of the mobile locker bank and including an access code which may be used to open a specific locker housing the associated package.

Exemplary Technical Platforms

As will be appreciated by one skilled in the relevant field, a system for using a mobile locker bank to expand capacity for accepting items at a fixed locker bank (or any other suitable location) may be, for example, embodied as a computer system, a method, or a computer program product. Accordingly, various embodiments may take the form of an entirely hardware-based embodiment, an entirely software-based embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web, mobile, wearable computer-implemented, computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of a system 100 according to a particular embodiment. As may be understood from this figure, the system 100 includes one or more computer networks 102, one or more servers 104, one or more databases 106, one or more locker bank computers 108 operatively coupled to one or more locker banks 110, one or more mobile locker bank computers 112 operatively coupled to one or more mobile locker banks 114, and optionally operatively coupled to or in wireless communication with a mobile computing device 116. The system 100 also includes one or more remote computing devices 118 (e.g., a tablet computer, a desktop or laptop computer, or a handheld computing device such as a smart phone). In particular embodiments, the one or more computer networks 102 facilitate communication between the one or more servers 104, database 106, one or more locker bank computers 108, one or more locker banks 110, one or more mobile locker bank computers 112, one or more mobile locker banks 114, one or more remote computing devices 118, and the mobile computing device 116. The one or more servers 104 may include one or more remote servers and facilitate the interaction, communication, and routing requirements between the one or more locker bank computers 108 and the one or more mobile locker bank computers 112.

The one or more computer networks 102 may include any of a variety of types of wired or wireless computer networks such as the Internet (or other WAN), a private intranet, a public switch telephone network (PSTN), a mesh network, or any other type of network (e.g., a network that uses Bluetooth (standard or low energy Bluetooth), beacon communication technologies (e.g., iBeacon), and/or near field communications to facilitate communication between computing devices). The communication link between the one or more servers 104, database 106, one or more locker bank computers 108, one or more locker banks 110, one or more mobile locker bank computers 112, one or more mobile locker banks 114, one or more remote computing devices 118, and the mobile computing device 116 may be, for example, implemented via a Local Area Network (LAN) or via the Internet (or other WAN). In particular embodiments, a communication link between the one or more locker bank computers 116, the mobile locker bank computer 112, and the mobile computing device 116 may be implemented via any suitable beacon communication technology (e.g., iBeacon) or any other suitable wireless communication link (e.g., WIFI, Bluetooth, infrared, NFC, IEEE 802.15.4, ZigBee, etc.).

Figure 2:
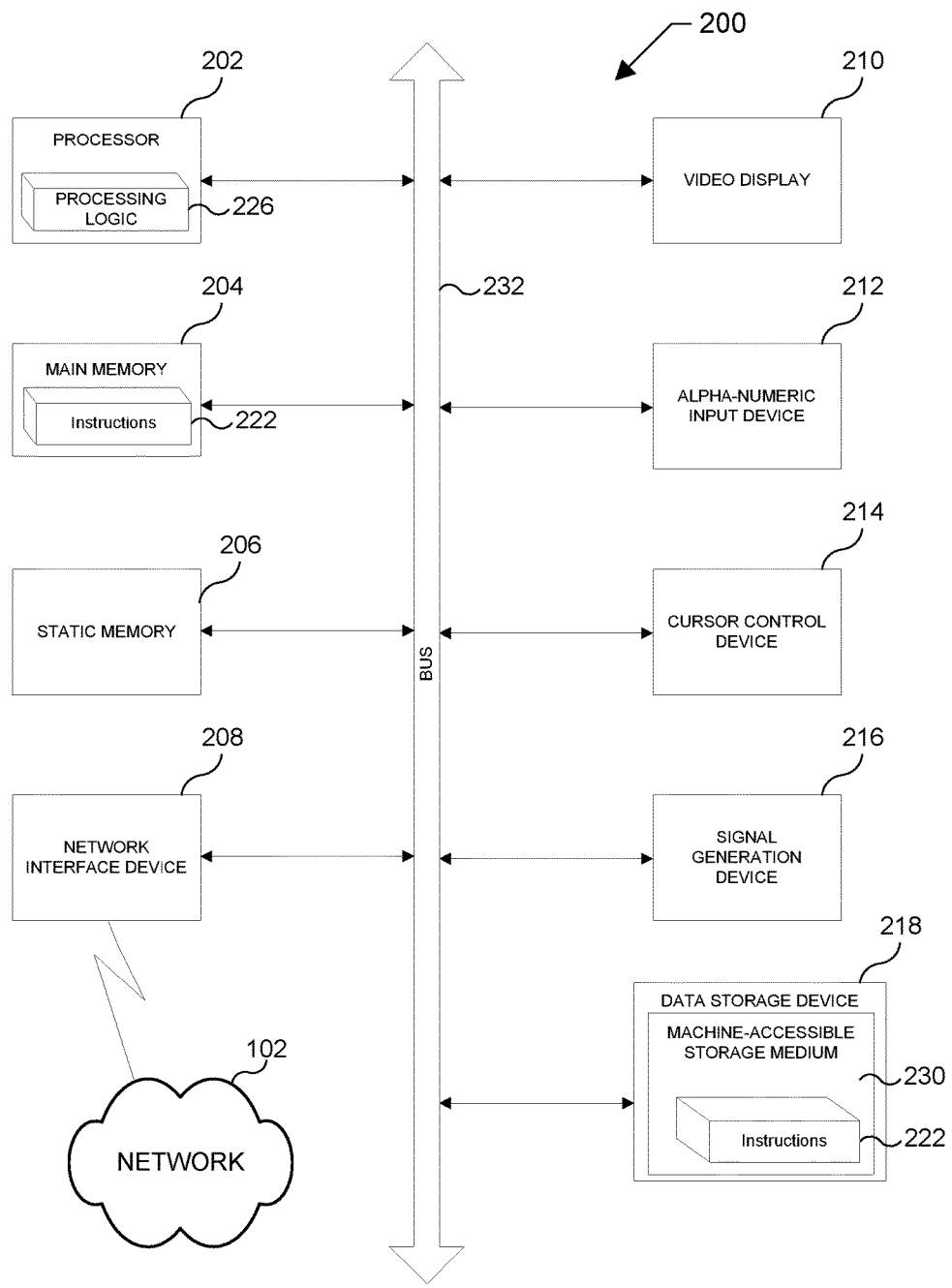
FIG. 2 is a schematic diagram of a computer, such as the server of FIG. 1, that is suitable for use in various embodiments.

FIG. 2 illustrates a diagrammatic representation of a computer architecture 200 that can be used within the system 100, for example, as a client computer (e.g., the mobile computing device 116, the one or more remote computing devices 118, the one or more locker bank computers 108, or the one or more mobile locker bank computers 112 shown in FIG. 1), or as a server computer (e.g., one or more servers 104 shown in FIG. 1). In particular embodiments, the computer 200 may be suitable for use as a computer within the context of the system 100 that is configured to facilitate the use of the mobile locker bank as an extension locker bank for holding additional items after a fixed locker bank has reached, or will reach, a threshold capacity.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-readable storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within main memory 204 and/or within processing device 202 during execution thereof by computer 200—main memory 204 and processing device 202 also constituting computer-accessible storage media. The software 222 may further be transmitted or received over a network 220 via network interface device 208.

While the computer-readable storage medium 230 is shown in an exemplary embodiment to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform any one or more of the methodologies of the present invention. The term "computer-readable storage medium" should accordingly be understood to include, but not be limited to, solid-state memories, optical and magnetic media, etc.

Exemplary Fixed Locker Bank and Mobile Locker Bank

Figure 3:
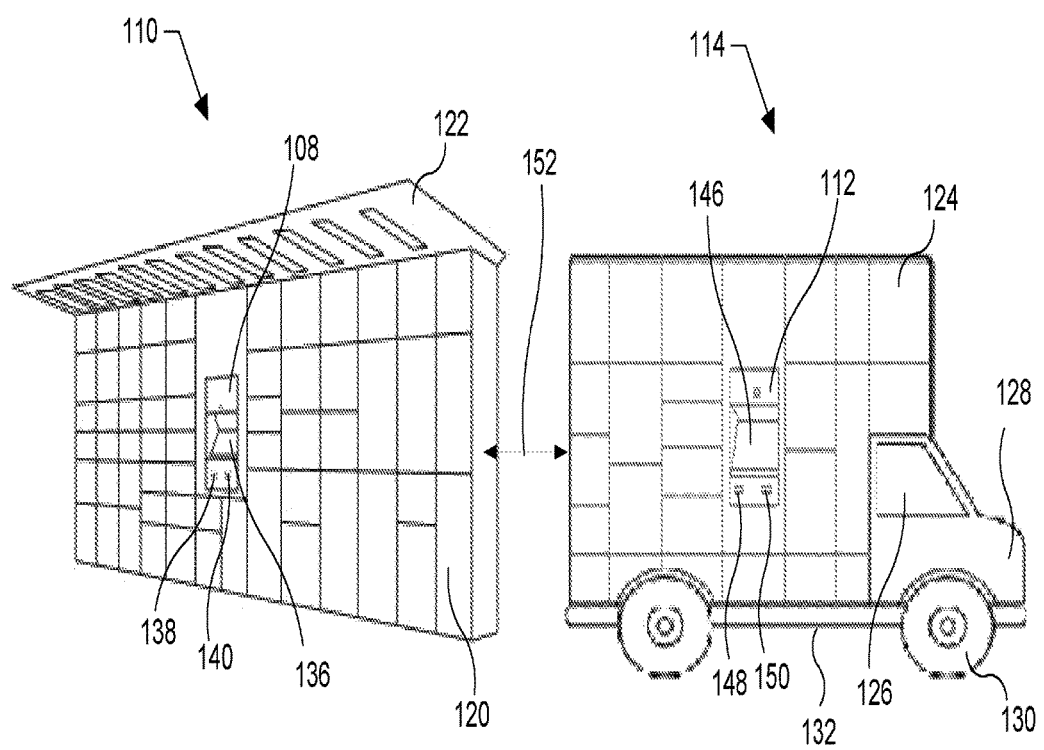
FIG. 3 is a perspective view of a mobile locker bank system for use in the locker system of FIG. 1.

FIG. 3 depicts an exemplary fixed locker bank 110, and mobile locker bank 114 that may be used in facilitating the expansion of the capacity of the fixed locker bank 110. As shown in this figure, the fixed locker bank 110, according to particular embodiments, includes a plurality of lockers 120 of varying sizes (e.g., small, medium, large, etc.). The fixed locker bank 110 may further include an awning 122 that extends outwardly from an upper portion of the fixed locker bank 110 and that may provide at least partial protection to users from various weather conditions such as rain, snow, wind, and sun when the users are placing parcels into the fixed locker bank 110 and/or retrieving parcels from the fixed locker bank 110.

In the embodiment shown in this figure, the fixed locker bank 110 includes a fixed locker bank computer 108 that users may use to facilitate the placement of one or more items into the fixed locker bank 110, for example, in any manner described in this disclosure or in any other suitable manner. The fixed locker bank computer 134, in particular embodiments, comprises a fixed locker bank touch screen display 136 for presenting a user interface for the user to interact with, a fixed locker bank card reader 138 and a fixed locker bank machine-readable indicia scanner 140 (e.g., a barcode scanner).

The mobile locker bank 114, according to particular embodiments, includes a plurality of lockers 124 of varying sizes (e.g., small, medium, large, etc.). The mobile locker bank 114 further includes a driver compartment 126, an engine 128, a plurality of wheels 130, a powertrain 132, and any other suitable feature for allowing the mobile locker bank to be moveable from one location to another location.

Furthermore, the mobile locker bank 114 includes a mobile locker bank computer 112 that users may use to facilitate the placement of one or more items into the mobile locker bank 114. The mobile locker bank computer 112, in particular embodiments, comprises a mobile locker bank touch screen display 146 for presenting a user interface for the user to interact with, a mobile locker bank card reader 148 and a mobile locker bank machine-readable indicia scanner 150 (e.g., a barcode scanner). In some embodiments, the fixed locker bank 110 and/or the mobile locker bank 114 may have all of these features, some of the features, or none of these features. For example, the mobile locker bank may have a mobile locker bank computer 112 that does not include a touch-screen so that users are required to use the fixed locker bank touch-screen display 136 to gain access to the mobile locker bank lockers 124. In various embodiments, the fixed locker bank touch-screen display 136 and/or the mobile locker bank touch-screen display 146 may display instructions for a user. For example, ether touch-screen may instruct the user on how to enter an access code, how to open and close the locker, how to lock and unlock the locker, etc.

In particular embodiments, the fixed locker bank 110 may be configured to communicate with the mobile locker bank 114 via any suitable communication link, such as, for example, a wired connection 152 or a wireless connection (e.g., BLUETOOTH, WIFI, Cellular, etc.). In various embodiments, the communication link may be manually established by a user when the mobile locker bank 114 is moved to the location where the fixed locker bank 110 is positioned or it may be automatically established when the mobile locker bank 114 comes within a predetermined distance of the fixed locker bank 110, when the mobile locker bank 114 comes within range of the fixed locker bank 110, or any other suitable criteria is satisfied for automatically establishing the communication link. Automatic wireless connections using BLUTETOOH, WIFI, and other wireless technology is explained in detail in U.S. patent application Ser. No. 15/252,629, entitled LOCKER BANKS WITH AUTOMATICALLY OPENING DOORS, filed on Aug. 31, 2016, the entire disclosure being incorporated by reference herein.

In various embodiments, the fixed locker bank computer 108 may be in direct or indirect wireless or wired communication with the mobile locker computer 112. For example, when the mobile locker bank 114 is moved to the location where the fixed locker bank 110 is located, the driver may, upon dropping off the mobile locker bank 114, be instructed to connect one or more electrical/communication cables (e.g., wired connection 152) between the fixed locker bank 110 and the mobile locker bank 114. The wired connection 152 may provide a communication channel over which the fixed locker bank computer 108 and the mobile locker bank computer 112 can directly communicate. In particular embodiments, the wired connection 152 may provide power to the mobile locker computer 112, or any other suitable component of the mobile locker bank 114. In various embodiments, the mobile locker bank computer 112 may use the wired connection 152 to gain access to the one or more networks 102 (FIG. 1) in order to communicate with the one or more servers 104 (FIG. 1), the mobile computing device 116 (FIG. 1), or any other suitable device.

In the case of a wireless connection, the fixed locker bank 110 may comprise a WIFI router (e.g., or one or more other suitable wireless access points or antennae) that establishes a local area wireless network at the location of the fixed locker bank 110. Thus, when the driver delivers the mobile locker bank 114 to the location of the fixed locker bank, the system may instruct the driver to connect a wireless receiver (e.g., or other suitable wireless antenna), associated with the mobile locker computer 112, to the local area wireless network established by the WIFI router. In this way, the mobile locker computer 112 can communicate either directly with the fixed locker bank computer 108 or indirectly with the fixed locker bank computer 108 via the one or more servers 104, for example, over the one or more networks 102. Alternatively, the fixed locker bank 110 and the mobile locker bank 114 may each contain any other suitable wireless communication device that is configured to enable the respective computers 108, 112 to communicate directly with the one or more servers 104 or indirectly with one another.

In various embodiments, the fixed locker bank 110 and/or the mobile locker bank 114 may be configured to communicate with a remote computer system (e.g., the one or more servers 104), a combination of a local (e.g., fixed locker bank computer 108) and a remote computer system (e.g., the one or more servers 104), or any other suitable computing systems for the purposes of transferring data (e.g., audio data, input data, video data, image date, etc.). In particular embodiments, the fixed locker bank computer 108 and the mobile locker bank computer 112 are configured to communicate via the one or more networks 102 (FIG. 1) and communicate directly with the one or more servers 104 (e.g., a logistics server). In such embodiments, the communication between the fixed locker bank computer 108 and the mobile locker bank computer 112 may be indirect via the one or more servers 104.

In other embodiments, a fixed locker bank computer may direct the operations of the other fixed locker bank computers and the mobile locker bank computers (e.g., act as an input device for the other computers). Also, a mobile locker bank computer may direct the operations of the other mobile locker bank computers and the fixed locker bank computers. For example, when the mobile locker bank is positioned at the same location as the fixed locker bank and a direct or indirect communication channel is established between the fixed locker bank computer 108 and the mobile locker bank computer 112, input at the fixed locker bank touch screen 136 may provide instructions for the operation of the mobile locker bank computer 112. Moreover, input at the mobile locker bank touch screen 146 may provide instructions for the operation of the fixed locker bank computer 108. Thus, in this configuration, when a mobile locker bank is positioned adjacent to a fixed locker bank 110, the combined system may allow two users to interact with the system at the same time. In this way, the fixed locker bank 110 and the mobile locker bank 114 may be controlled by the fixed locker bank computer 108 and/or the fixed locker bank 110 and the mobile locker bank 114 may be controlled by the mobile locker bank computer 112.

In various embodiments, the fixed locker bank 110 and the mobile locker bank 114 may be in proximity to one another, for example, when: (1) the fixed locker bank 110 and the mobile locker bank 114 are located at the same address; (2) the fixed locker bank 110 and the mobile locker bank 114 are within a particular distance of one another; (3) the fixed locker bank 110 and the mobile locker bank 114 are sufficiently closed to enable wireless communication between the two (e.g., the fixed locker bank 110 and the mobile locker bank 114 are within range of respective wireless transmitters, receivers, and or other suitable wireless antennae); etc.

In a particular embodiment, the fixed locker bank 110 and the mobile locker bank 114 each comprise one or more secure lockers 120, 124, respectively, made of a sufficiently strong material to prevent unwanted access to the lockers (e.g., a suitable metal such as steel, steel cage, aluminum, metal alloy, etc.). In various embodiments, the secure lockers 120, 124 of the fixed locker bank 110 and the mobile locker bank 114 comprise any suitable number, size, shape, dimension locker. For example, a particular fixed locker bank may include 25 secure lockers of varying sizes and shapes that are configured to hold a variety of different sized items.

In various embodiments, each of the secure lockers 120 of the fixed locker bank 110 and the secure lockers 124 of the mobile locker bank 114 comprise an enclosure (e.g., a substantially rectangular enclosure or any suitably shaped enclosure) defining at least one opening. In various embodiments, the plurality of lockers each comprise at least one door moveably coupled to the enclosure adjacent the opening for selectively restricting access to the interior of the enclosure. In particular embodiments, the at least one door is positioned to selectively prevent access to the interior of the locker enclosure through the at least one opening when the at least one door is in a first closed position. In various embodiments, the at least one door is configured, when in a second open position, to provide access to the interior of the locker enclosure through the at least one opening. The one or more lockers may have two sidewalls, a top wall, a back wall and a bottom wall. In various embodiments, the bottom wall may be a shared wall between a first locker positioned above a second locker such that the shared wall defines the bottom wall of the first locker and the top wall of the second locker.

The one or more lockers 120 of the fixed locker bank 110 and the one or more lockers of the mobile locker bank each comprise at least one locking mechanism for maintaining the at least one door in a closed position. In particular embodiments, the locking mechanisms are respectively controlled by the fixed locker bank computer 108 and the mobile locker bank computer 112, which may, for example, require an access code (e.g., a PIN, an alphanumeric code, QR code, linear barcode, Maxi code, etc.) in order to unlock a particular locker. The fixed locker bank computer 108 and/or the mobile locker bank computer 112 may control access to each of the one or more lockers 120, 124. In particular embodiments, each particular locker 120, 124, respectively, may be controlled by the fixed locker bank computer 108, the mobile locker bank computer 112, or both the fixed locker bank computer 108 and the mobile locker bank computer 112 (e.g., while the fixed locker bank 110 and the mobile locker bank 114 are in wired or wireless communication with one another).

Mobile Locker Bank Alternate Embodiments

Figure 4A:
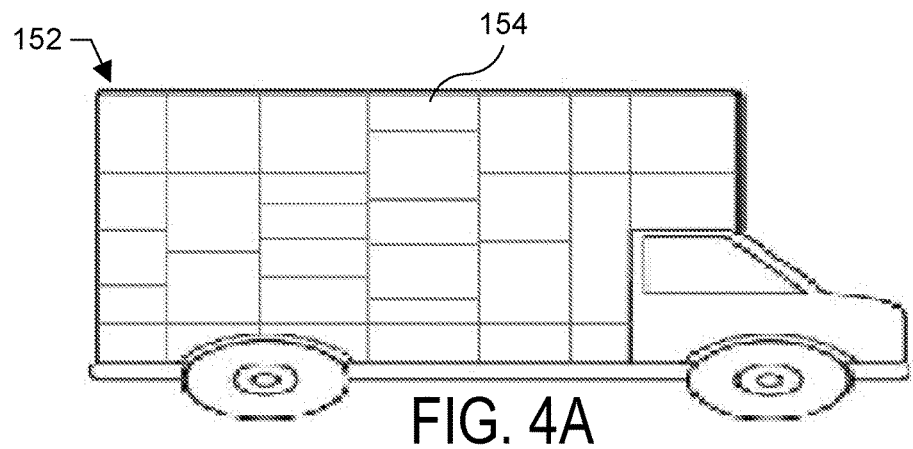
FIGS. 4A-4C depict alternate embodiments of the mobile locker bank system of FIG. 3.
Figure 4B:
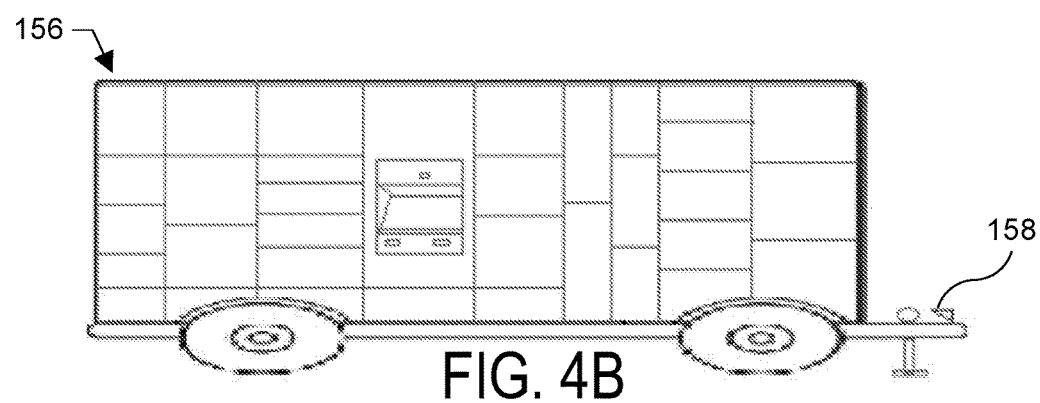
Figure 4C:
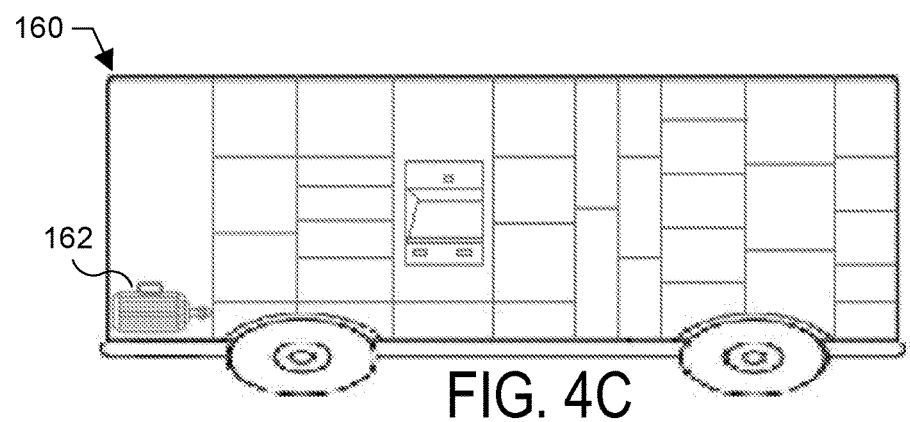

FIGS. 4A-4C show alternative embodiments of the mobile locker bank 114 of FIG. 3. For purposes of ease of understanding and clarity, only certain parts will be discussed to highlight the differences in the structure and operation of the embodiments shown in FIGS. 4A-4C as compared to the embodiment shown in FIG. 3.

Referring to FIG. 4A, a first alternate embodiment mobile locker bank 152 is shown having no visible mobile locker bank computer. Rather, the mobile locker bank computer of the mobile locker bank 152 is enclosed within the mobile locker bank 152, in a position easily accessible by a technician, for instance, but out of view and inaccessible to other users such as customers. The outer portion of the mobile locker bank 152, in this embodiment has instead been replaced with additional lockers 154. This alternate embodiment of the mobile locker bank 152 may be useful in situations where the mobile locker bank will be used in potentially higher crime areas or where it is preferred to have a single touchscreen associated with a fixed locker bank controlling the operation of the mobile locker bank lockers (e.g., input at the fixed locker bank computer drives operation of the mobile locker bank computer).

Referring to FIG. 4B, a second alternate embodiment of a mobile locker bank 156 is shown. In this alternate embodiment, the mobile locker bank 156 lacks an engine, powertrain, and driver compartment. Instead, the mobile locker bank 156 must be coupled to another vehicle via a trailer hitch using any suitable trailer coupler 158 to transport the mobile locker bank 156 to and from a particular location. This alternate embodiment may be beneficial in saving fuel and saving on production costs associated with manufacturing a drivable mobile locker bank.

Referring to FIG. 4C, a third alternate embodiment of a mobile locker bank 160 is shown. In this alternate embodiment, the mobile locker bank 160 is a self-driving mobile locker bank. Therefore, the mobile locker bank does not have a driver compartment. In addition, in various embodiments, the self-driving mobile locker bank 160 may be powered by any suitable electric motor 162. This alternate embodiment may be beneficial for saving on labor costs in addition to saving fuel for embodiments using the electric motor 162.

As may be understood by one skilled in the art, any of the components of each alternate embodiment may be combined with each other and with earlier described embodiments and/or with any other suitable features.

Exemplary System Platform

Various embodiments of a locker bank having a plurality of lockers and one or more computer systems and a mobile locker bank having a plurality of lockers and one or more computer systems are described above for use in expanding a number of available lockers at the fixed locker bank location. In particular embodiments, these systems may be implemented within the context of any suitable event coordinating system (e.g., Ticketmaster) and/or a computerized locker system such as one offered by a common carrier (e.g., such as United Parcel Service of America, Inc. of Atlanta, Ga.) or other logistic service providers. Various aspects of the system's functionality may be executed by certain system modules, including a capacity determination module 500, and a fixed locker bank/mobile locker bank locker inventory module 600. These modules are discussed in greater detail below.

It should be understood, in light of this disclosure, that the various functions described below in the context of the capacity determination module 500 and the fixed locker bank/mobile locker bank locker inventory module 600 may be implemented in a manner other than the modular architecture described below. Various embodiments of these functions are described below in this manner to facilitate understanding of the invention described herein. Furthermore, while various embodiments described below may refer to various functions performed by the system 100, it should be understood that such functions may be performed, in particular embodiments, by any suitable component of, or combination of components of the system 100, such as those described above with respect to FIG. 1 (e.g., the one or more servers 104, the one or more locker bank computers 108, the one or more mobile locker bank computers 112, the mobile computing device 116, the one or more remote computing devices 118 etc.).

Additionally, although various steps and functions are described as occurring in response to another step, function, or triggering event, it should be understood that in various other embodiments, such functions or steps may occur in response to any other triggering functions or events; independent of any triggering functions or events; at least partially in response to any triggering functions or events; or in response to or at least partially in response to any combination of triggering functions, steps, events, etc. Although these exemplary modules are described as performing these functions in a particular order, it should be further understood that various other embodiments and implementations of these functions may occur in an order other than in which they are presented. Still other embodiments may omit particular steps or functions described below or perform additional steps or functions to those described.

A. Capacity Determination Module

Figure 5:
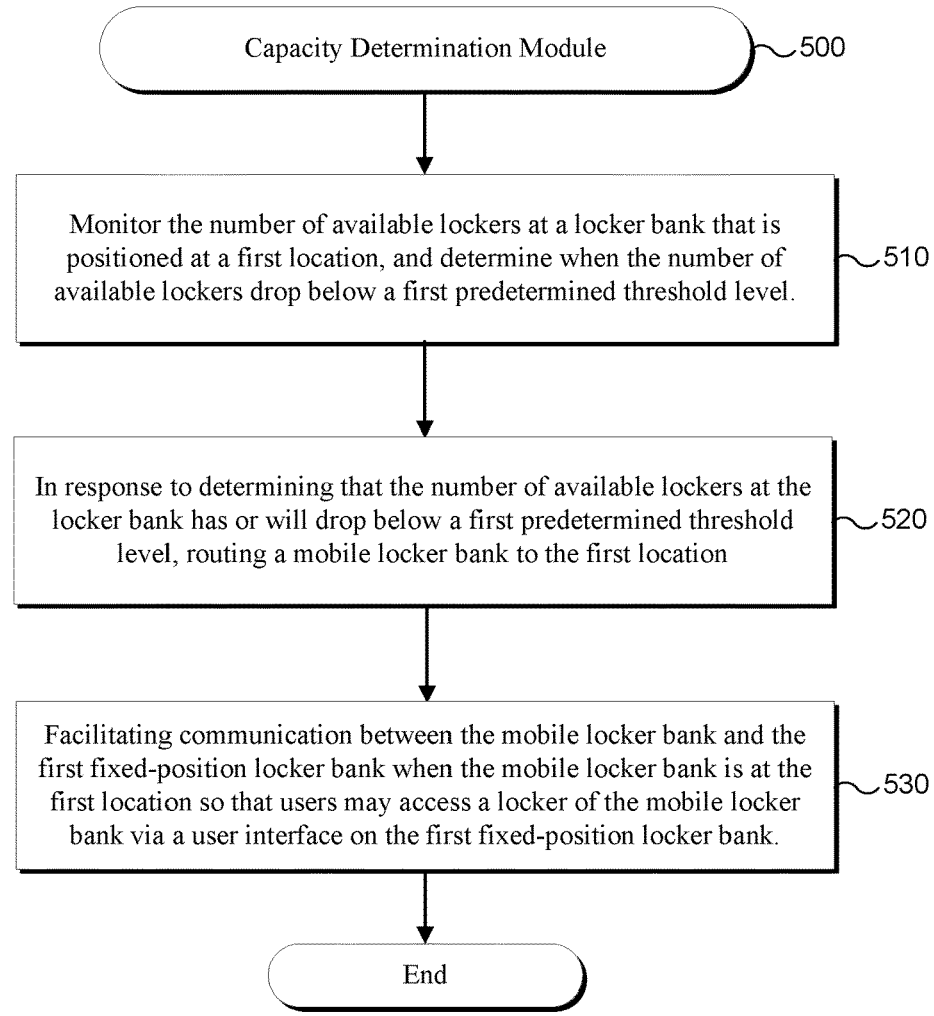
FIG. 5 depicts a flow chart that generally illustrates various steps executed by a Capacity Determination Module that, for example, may be executed by the server of FIG. 1.

FIG. 5 is a flow chart of operations performed by an exemplary capacity determination module 500 and executed by, for example, the one or more servers 104, the one or more locker bank computers 108, the one or more mobile locker bank computers 112, etc. discussed above with reference to FIG. 1. In particular embodiments, the capacity determination module 500 may facilitate the coordination of routing a mobile locker bank to a fixed locker bank that has or that will reach a threshold capacity. Various steps of an exemplary capacity determination module 500 are described below. Although these steps are discussed in a particular order, it should be understood that particular embodiments of the capacity determination module 500 may include one or more additional steps to those described, may omit one or more of the described steps, or may perform any of the steps in an order other than which they are presented.

I. Monitor the Number of Available Lockers at a Locker Bank that is Positioned at a First Location and Determine when the Number of Available Lockers Drop Below a First Predetermined Threshold Level Referring to FIG. 5, when executing the capacity determination module 500, the system (e.g., the one or more locker bank computers 112) begins, in various embodiments, at Step 510, by monitoring the number of lockers at a locker bank that is positioned at a first location and determine when/if the number of available lockers drops below a first predetermined threshold level. In various embodiments, the locker bank may be a fixed-position locker bank 110. In some embodiments, the locker bank may be a mobile locker bank 114.

In example embodiments, the system (e.g., the one or more servers 104) may determine a total capacity for the fixed locker bank prior to determining a first predetermined threshold level. For example, the system may determine that a locker bank has 24 lockers available and that the first predetermined threshold level of available lockers is 25%. Thus, when the number of available lockers drops below 6 or is forecasted (e.g., by the one or more serves 104) to drop below 6 lockers, the system determines that the number of available lockers has dropped or will drop below the first predetermined threshold level.

In various embodiments, the system may determine that the total capacity for the fixed locker bank has dropped (e.g., or will drop) below the first predetermined threshold level of available lockers in response to receiving input from a user (e.g., a delivery driver) based on information from the driver on the need to deliver multiple items to the locker bank. In some embodiments, the system may determine that the fixed locker bank has dropped (e.g., or will drop) below the first predetermined threshold level of available lockers based on one or more sensors located within each of the lockers of the fixed locker bank that are configured to detect the presence of an item within the lockers. In various embodiments, the system may determine that the fixed locker bank has dropped (e.g., or will drop) below the first predetermined threshold level of available lockers based on reservation information associated with the fixed locker bank. For example, one or more users may reserve one or more lockers at the fixed locker bank for one or more items to be stored (e.g., prior to the one or more items actually being stored in the one or more lockers), which would potentially cause the number of available lockers at the fixed locker bank to drop below the first predetermined threshold level once the items are placed within the reserved lockers.

In particular embodiments, the system may determine that the fixed locker bank has dropped (e.g., or will drop) below the first predetermined threshold level of available lockers during an inventory forecasting stage for the fixed locker bank. In example embodiments, the system (e.g., the one or more servers 104) may determine that the fixed locker bank has dropped (e.g., or will drop) below the first predetermined threshold level of available lockers based on analytics used to forecast the number of available lockers at a time in the future. For example, the system (e.g., the one or more servers 104) may determine that a particularly high traffic area is in need of a fixed locker bank and may determine that the particular fixed locker bank will have insufficient available lockers and, as such, a mobile locker bank is necessary in conjunction with the fixed locker bank. In some embodiments, the system may determine that the locker bank has dropped (e.g., or will drop) below the first predetermined threshold level of available lockers in response to receiving a request to deliver a particular number of items to the locker bank. For example, the system may receive a request to deliver baseball tickets to a locker bank located near a baseball field for late pick up by multiple different patrons of the field and the number of ticket groups (e.g., grouped by patron) may exceed the number of available lockers at the locker bank thereby necessitating an expansion of lockers via a mobile locker bank. In various embodiments, the predetermined threshold level of available lockers may be any predetermined level. In particular embodiments, the predetermined threshold level may include that no lockers are available, that a certain number of lockers are available, or that a certain percentage of lockers are available. For example, the system (e.g., the one or more locker bank computers 108) may be configured to determine that the number of available lockers has reached the threshold capacity when 20% of the lockers within the fixed locker bank are available so that the fixed locker bank does not have to turn away customers and/or items if the remaining 80% of the lockers become full before a mobile locker bank is dispatched to the fixed locker bank location. Particularly, the one or more locker bank computers 108 monitor when an item is placed in a locker and the lock is activated. Likewise, the locker is considered unoccupied when the same locker is opened a second time or a sensor provides data that the locker is empty.

In various embodiments, the system may forecast or project parcels to go into the fixed locker bank for a day, week, or other timeframe without regards to any reservation of any locker. The system knows the number of parcels that must be delivered to the fixed locker bank for a given time period. The system can maintain this "virtual" inventory for the forecasted or projected use in addition to the "physical" inventory determined at the fixed locker bank. The virtual inventory is the anticipated use of the fixed locker bank with parcels that will be delivered over the day, week, or other timeframe. The physical inventory is the actual number of available and unavailable lockers at any given time at the fixed locker bank. Based on the virtual and physical inventories, a determination can be made whether a mobile locker bank is needed, either to supplement the fixed locker bank or to be used in a standalone location. In other words, locker capacity can be tracked based on parcels that are bound for the fixed locker bank and parcels that are actually present in the lockers at the fixed locker bank. From these known items, a prediction can be made about the locker capacity such as whether to add a mobile locker bank. One benefit from these embodiments is that a mobile locker bank can be arranged for use in advance rather than waiting for available lockers to drop below a threshold at the fixed locker bank. And just as a determination of locker capacity can be made for the fixed locker bank, the system can make a determination of locker capacity for the mobile locker bank in the same manner.

II. In Response to Determining that the Number of Available Lockers at the Locker Bank has or Will Drop Below a First Predetermined Threshold Level, Routing a Mobile Locker Bank to the First Location Continuing to Step 520, in response to determining that the number of available lockers at the locker bank has dropped below a first predetermined threshold level, the system routes a mobile locker bank to the first location to accept additional items. In various embodiments, the system may route the mobile locker bank to the first location substantially automatically in response to determining that the number of available lockers at the locker bank has/will drop below the first predetermined threshold level. To route the mobile locker bank to the location of the locker bank, the system may notify a particular delivery driver to drive the mobile locker bank to the first location (e.g., the one or more servers 104 may transmit a notification to the mobile computing device 116 associated with the particular delivery driver instructing him or her to drive the mobile locker bank to the first location). In some embodiments, the system may route the mobile locker bank to the location of the locker bank using a self-driving mobile locker bank that is remotely controlled (e.g., or locally controlled by one or more control systems on the mobile locker bank). In particular embodiments, the system may route the mobile locker bank to the locker bank to accept additional items by instructing a user (e.g., a delivery driver) to couple a mobile locker bank trailer to a vehicle and tow the mobile locker bank trailer to the location of the locker bank.

In particular embodiments, the system (e.g., the one or more servers 104) may route the mobile locker bank to a position substantially adjacent the fixed locker bank 110. In various embodiments, the position substantially adjacent to the fixed locker bank may include having one or more sides of the fixed locker bank touch/connect to one or more sides of the mobile locker bank. In some embodiments, the system may route the mobile locker bank to a position within a particular distance of the fixed locker bank. In various embodiments, the system may route the mobile locker bank to a position in proximity to the locker bank that has one or more mounting devices for the mobile locker bank in order to secure the mobile locker bank to the locker bank. In some embodiments, the mobile locker bank may include one or more securing devices (e.g., clamps, locks, bolts, etc.) for securing the mobile locker bank to the locker bank.

III. Facilitating Communication Between the Mobile Locker Bank and the First Fixed-Position Locker Bank when the Mobile Locker Bank is at the First Location so that Users May Access a Locker of the Mobile Locker Bank Via a User Interface on the First Fixed-Position Locker Bank Continuing at Step 530, in various embodiments, after routing the mobile locker bank to the location of the locker bank, the system (e.g., the one or more servers) may instruct a user (e.g., a delivery driver) to establish a wireless or wired connection between the mobile locker bank and the locker bank, as discussed above with reference to FIG. 3. In particular embodiments, the system may instruct the user on how to establish the connection between the mobile locker bank and the locker bank via a mobile computing device 116 associated with the user (e.g., by transmitting one or more instructions to the mobile device 116). For example, when the driver arrives at the location of the locker bank, the mobile computing device 116 may instruct the driver to scan a barcode associated with the locker bank and scan a second barcode associated with the mobile locker bank. The information received from each scanned barcode may then be transmitted from the mobile computing device to the one or more servers 104 (e.g., a logistics server) to associate the plurality of lockers in the mobile locker with the plurality of lockers in the locker bank. In some embodiments, the system may instruct the user on how to establish a connection between the mobile locker bank and the locker bank via the mobile locker bank computer touch screen. In still other embodiments, the system may instruct the user on how to establish the connection between the mobile locker bank and the locker bank via the fixed locker bank computer touch screen.

In various embodiments, the system may instruct the driver of the mobile locker bank using the mobile computing device 116 to connect the mobile locker bank to the locker bank at the location using the cable 152 (FIG. 3). In this way, the cable 152 may provide one or more of power and a communication channel to the mobile locker bank 114. In some embodiments, the locker bank computer 108 may communicate directly with the mobile locker bank computer 112 via the cable 152. In other embodiments, the communication channel may provide the mobile locker bank computer 112 a pathway to communicate directly with the one or more servers 104. In this way, the mobile locker bank computer 112 can communicate indirectly with the locker bank computer 108 via the one or more servers 104.

In various embodiments, when a driver drops off the mobile locker bank 114 at the location of the locker bank, the system may direct the driver to establish a wireless connection between the mobile locker bank and the locker bank by providing directions either on the touch screen 136 of the locker bank 110, the touch screen 146 on the mobile locker bank 114, or via the mobile computing device 116. For example, in some embodiments, the system (e.g., the one or more servers 104) may direct the driver to scan a barcode on the locker bank and a barcode on the mobile locker bank. The bar codes may allow the system to look up information about each of the locker bank and the mobile locker bank thereby allowing the system to automatically establish a communication link between the mobile locker bank and the locker bank. For example, the barcode on the locker bank may provide information to the system regarding a WIFI network that is associated with the locker bank thereby allowing the system to cause the mobile locker bank to wirelessly connect to the WIFI network via a WIFI card operatively coupled to the mobile locker bank computer 112.

In other embodiments, the system may instruct the driver to couple the mobile locker bank 114 to the locker bank 110 using the cable 152 in order to provide the mobile locker bank power. Additionally, the system may then instruct the driver via the mobile computing device 116 to establish a wireless connection between the mobile locker bank computer 112 and the locker bank computer 108. In these embodiments, the locker bank and mobile locker bank have both a wireless and a wired connection between one another.

In various embodiments, when the fixed locker bank and mobile locker bank are connected or used together, two approaches can be used to determine locker capacity. In one approach, the system can determine a virtual inventory and physical inventory for the fixed locker bank (as discussed earlier), but also determine a virtual inventory and physical inventory for the mobile locker bank. Consequently, the system would maintain multiple virtual and physical inventories for locker banks, whether fixed or mobile. The system can determine locker capacity for each locker bank using the virtual and physical inventories. From there, the system could merge the inventories or merge the locker capacity determinations to forecast one locker capacity for all the locker banks located together. The idea here is that one or more mobile locker banks might be placed near a fixed locker bank. So, the system can determine locker capacities at a per locker bank level. In another approach, the fixed locker bank and mobile locker bank are treated as one entity. The system determines a virtual inventory and physical inventory for the one entity. Like the capacity determination discussed above for the fixed locker bank using the virtual and physical inventories, a forecast or prediction can be made whether to add an additional mobile locker bank.

B. Fixed Locker Bank/Mobile Locker Inventory Module

Figure 6:
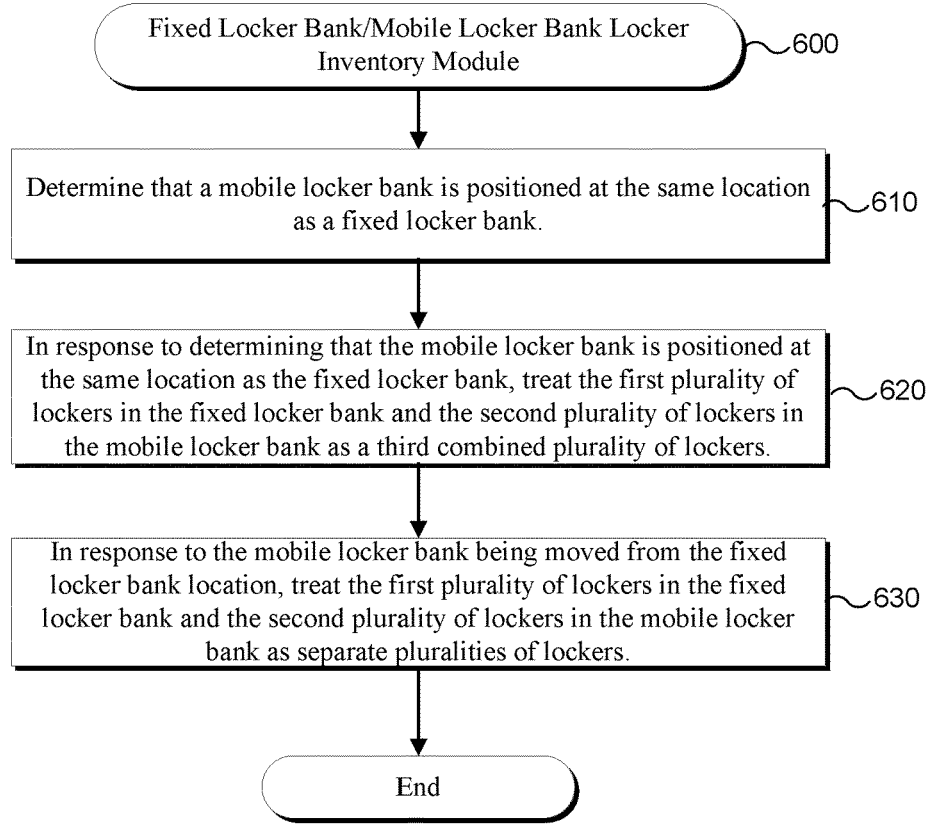
FIG. 6 depicts a flow chart that generally illustrates various steps executed by a Fixed Locker Bank/Mobile Locker Bank Inventory Module that, for example, may be executed by the server of FIG. 1.

FIG. 6 is a flow chart of operations performed by an exemplary fixed locker bank/mobile locker bank inventory module 600 and executed by, for example, the one or more servers 104, the locker bank computer 108, and/or the mobile locker bank computer 112, as discussed above with reference to FIG. 1. In particular embodiments, the fixed locker bank/mobile locker inventory module 600 may facilitate the system treating a first plurality of lockers at a locker bank and a second plurality of lockers at a mobile locker bank positioned at the same location as the locker bank as a third combined plurality of lockers. Various steps of an exemplary fixed locker bank/mobile locker inventory module 600 are described below. Although these steps are discussed in a particular order, it should be understood that particular embodiments of a fixed locker bank/mobile locker bank communication module 600 may include one or more additional steps to those described, may omit one or more of the described steps, or may perform any of the steps in an order other than which they are presented.

I. Determine that a Mobile Locker Bank is Positioned at a Location Adjacent a Fixed Locker Bank When executing the fixed locker bank/mobile locker bank inventory module 600, the system begins at Step 610 by determining that a mobile locker bank is positioned at the same location as another locker bank (e.g., a fixed locker bank, a mobile locker bank, an attended/unattended access point, etc.). According to various embodiments, the system may determine that the mobile locker bank is at the same location as the locker bank using any suitable locating technology (e.g., based on GPS coordinates of the mobile computing device, via near field communication (NFC), Bluetooth, or any other suitable wireless communication protocol), by scanning a barcode on the locker bank and on the mobile locker bank, and/or based on a location of the mobile locker bank and/or a delivery vehicle delivering the mobile locker bank (e.g. telematics).

In particular embodiments, the system may determine that the mobile locker bank is at the same location as the locker bank in response to the delivery driver scanning machine-readable indicia (e.g., QR code, linear barcode, Maxi code, etc.) on the mobile locker bank and on the locker bank using the mobile computing device 116. In some embodiments, the system may determine that the mobile locker bank is positioned at the location of the locker bank in response to the delivery driver scanning the machine-readable indicia using a barcode scanner associated with the locker bank computer. In other embodiments, the system may determine that the mobile locker bank is positioned at the location of the fixed locker bank in response to a user connecting the mobile locker bank to the fixed locker bank. For example, once the delivery driver has wirelessly connected the mobile locker bank to the fixed locker bank and/or physically connected a power supply and other cabling from the fixed locker bank to the mobile locker bank, the system determines that the mobile locker bank is now associated with the fixed locker bank.

In particular embodiments, the mobile computing device 116 may be any suitable device such as a mobile computing device, a wireless device such as a smart phone, tablet or other computing device. In various embodiments, the mobile computing device is a device associated with a particular delivery driver. In these embodiments, the mobile computing device may be continuously logged into an application for accessing and providing mobile locker bank location information to a database connected to the one or more servers 104 (e.g., a remote logistics server). In other embodiments, the mobile computing device may automatically connect to the computing device of the locker bank or the mobile locker bank when the mobile computing device is moved within a particular distance from the locker bank computer and/or the mobile locker bank computer.

In still other embodiments, the system may automatically establish a wireless connection between the mobile locker bank computer and the locker bank computer in response to determining that the mobile locker bank is at a location adjacent the fixed locker bank. Suitable methods for automatically establishing a wireless connection (e.g., a direct wireless connection) between computing devices are described in detail in U.S. patent application Ser. No. 15/252,629, entitled LOCKER BANKS WITH AUTOMATICALLY OPENING DOORS, filed on Aug. 31, 2016, the entire disclosure being hereby incorporated by reference. U.S. patent application Ser. No. 15/252,629 particularly describes automatic establishment of wireless connection between a mobile computing device and a locker bank computer. It should be understood that similar techniques may be utilized in the system described herein to initiate wireless connection between a mobile locker bank computer and a locker bank computer.

II. In Response to Determining that the Mobile Locker Bank is Positioned at a Location Adjacent the Fixed Locker Bank, Treat the First Plurality of Lockers in the Fixed Locker Bank and the Second Plurality of Lockers in the Mobile Locker Bank as a Third Combined Plurality of Lockers.

At Step 620, in response to determining that the mobile locker bank is positioned at the same location as the fixed locker bank, the system can treat the first plurality of lockers in the fixed locker bank and the second plurality of lockers in the mobile locker bank as a third combined plurality of lockers. In particular embodiments, when the mobile locker bank is delivered to the location of the locker bank and the system has been notified, the one or more servers 104 may establish a relationship between a database associated with the locker bank and a database associated with the mobile locker bank. That is, each fixed locker bank and each mobile locker bank may have a data structure (e.g., one or more databases 106) associated therewith that is used to track whether a locker in the locker bank is available for use. When a mobile locker bank is delivered to a location where another locker bank (fixed or mobile) is positioned, the system may be configured to link the database of the locker bank with the database of the mobile locker bank so, for purposes of assigning items to a locker, the system treats the totality of available lockers at the location to include both the mobile locker bank lockers and the locker bank lockers.

It should be understood that one of skill in the art would understand that there are other ways to link or concatenate the locker bank database with the mobile locker database so that the system treats the two lockers banks as a single locker bank for the time that the mobile locker bank is at the same location as the locker bank. For example, the one or more servers 104 may expand the locker database to include additional entries to accommodate the additional locker capacity provided by the mobile locker while the mobile locker is positioned at the same location as the locker bank. For example, the database associated with the locker bank may comprise 50 data lines where each data line is linked to a respective locker (i.e., 50 total lockers) in the locker bank. When a mobile locker bank having 25 lockers is delivered to the location where the locker bank is positioned, the system may expand the database associated with the locker bank from 50 data line to 75 data lines to accommodate the expanded capacity provided to the locker bank by the mobile locker bank. For purposes of the system, the system now treats the locker bank as having an expanded capacity of 75 lockers.

In some embodiments, the system also modifies which computing system (e.g., the locker bank computer 108, the mobile locker bank computer 112) controls access to the lockers located within the locker bank and the mobile locker bank. For example, linking the database for the locker bank with the database for the mobile locker bank may also cause the system to modify the computer system 112 of the mobile locker bank to disable the touch screen 146 so that users requesting access to one or more lockers of the locker bank and/or the mobile locker bank must use the locker bank touch screen 136. In this way, the locker bank and the mobile locker bank operate as a single seamless bank of lockers from the perspective of the user. In various embodiments, in response to the system linking the database of the locker bank with the database of the mobile locker bank, when a user accesses the system to reserve a locker at the location, the system may present the user with all of the lockers of the locker bank and the mobile locker bank as a "single" locker bank (i.e., numbered sequentially as if they formed a single locker bank). Thus, from the user's perspective, the locker bank and mobile locker bank appear to be a single bank of lockers.

III. In Response to the Mobile Locker Bank Being Moved from the Fixed Locker Bank Location, Treat the First Plurality of Lockers in the Fixed Locker Bank and the Second Plurality of Lockers in the Mobile Locker Bank as Separate Pluralities of Lockers.

At Step 630, once it is determined that the mobile locker bank is no longer needed at the location of the fixed locker bank to expand the number of available lockers, the system may instruct a driver to remove the mobile locker bank from the location. When the driver arrives to remove the mobile locker bank, the driver may notify the system that the mobile locker bank is being moved. The drive may notify the system using a mobile computing device. The mobile computing device may be programmed to take the driver through a series of steps for removing the mobile locker bank. In response to this notification, the system may unlink the database associated with the fixed locker bank and the database associated with the mobile locker bank so that the plurality of lockers of the fixed locker bank are treated as a separate plurality from the plurality of lockers associated with the mobile locker bank.

In various embodiments, the system may instruct the driver to move items stored within lockers in the mobile locker bank into available lockers in the fixed locker bank. In doing so, the system must update information associated with the items so that the location of the item (e.g., the physical address where they are stored and the actual locker number that they are stored in) is updated in the database associated with the fixed locker bank and/or a database associated with the item. In other embodiments, the system (e.g., the one or more servers 104) may instead determine that the items stored in a locker in the mobile locker bank should remain in the mobile locker bank and be moved to a new location. In this case, the system may unlink the database associated with the mobile locker bank and the fixed locker bank and update information (e.g., tracking information) associated with the item to include new location information as to where the mobile locker bank will be located.

When placing items into the lockers, the system can prioritize placement. For example, the system may consider placement into the fixed locker bank first to minimize the number of packages to be moved if the mobile locker bank is relocated. Also, if the consignee for a particular package has a history of picking up parcels quickly, the system may consider placement of those parcels into the mobile locker bank, since those parcels would only be in the locker for a short time.

Exemplary User Experience

Figure 7:
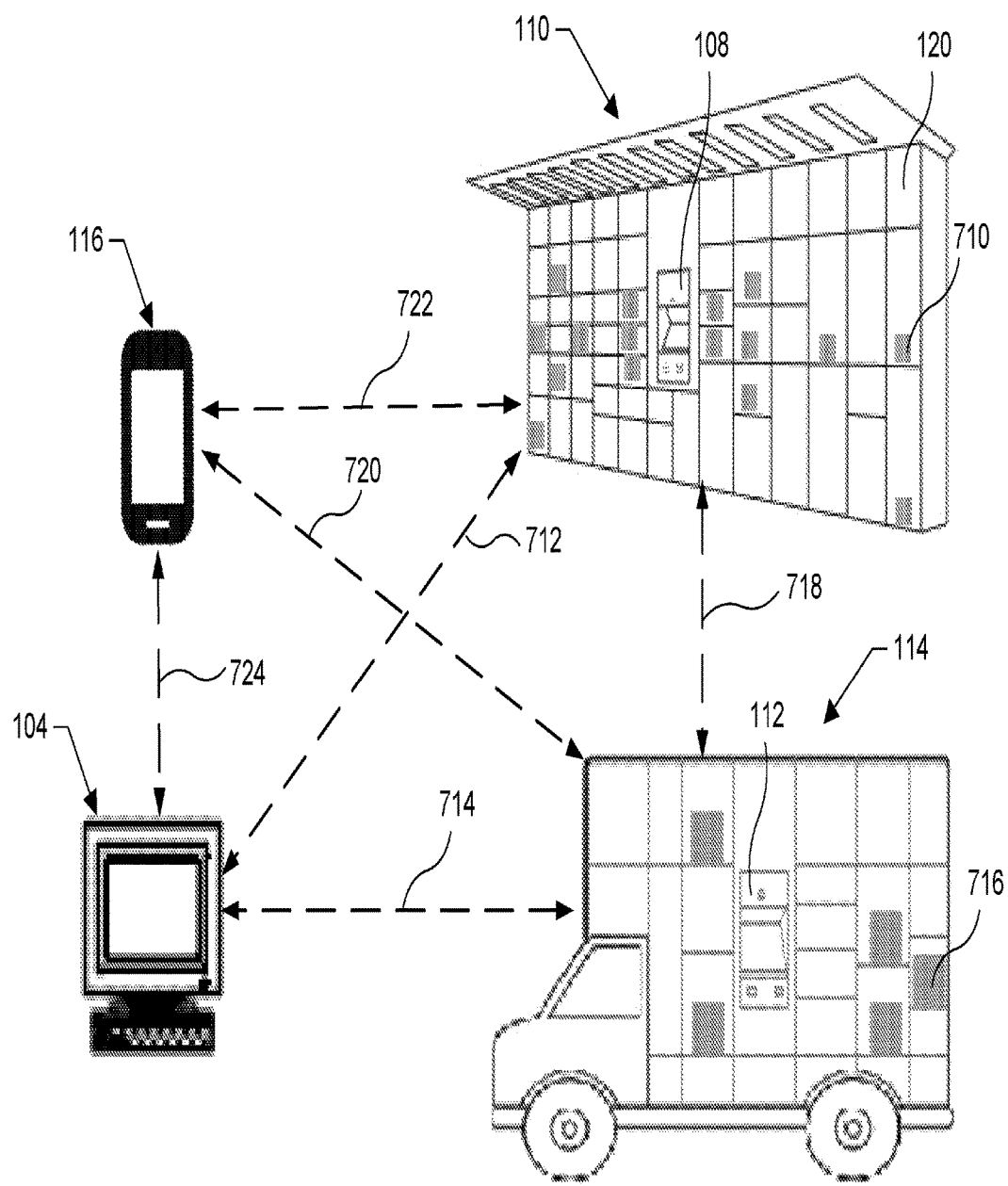
FIG. 7 depicts an exemplary user experience according to various embodiments.

FIG. 7 depicts an exemplary user experience that may occur in the context of using the system described above to facilitate the expansion of a fixed locker bank by routing a mobile locker bank to a position proximate the fixed locker bank. As discussed with reference to FIGS. 1 and 3, the locker bank system includes a fixed locker bank 110, a mobile locker bank 114, one or more servers 104 (e.g., a logistics server), and (optionally) a mobile computing device 116. In various embodiments, the fixed locker bank 110 may have a particular number of lockers 120. When these lockers 120 are housing one or more items 710, the number of available lockers at the fixed locker bank 110 may drop below a predetermined threshold capacity that requires additional lockers for future items. If the threshold capacity is reached, the fixed locker bank computer 108 may communicate with the one or more servers 104 via a first communication channel 712 to request that the mobile locker bank 114 be routed to the fixed locker bank 110 location to accept additional items. The one or more servers 104 may then open a second communication channel 714 between the one or more servers 104 and the mobile locker bank 114. In particular embodiments, the mobile locker bank 114 may already be housing one or more items 716. In some embodiments, the items 716 within the mobile locker bank 114 may be placed there prior to sending the mobile locker bank 114 to the location of the fixed locker bank 110.

Once the mobile locker bank 114 arrives at the location of the fixed locker bank 110, the system may instruct the driver of the mobile locker bank 114 to establish a wireless communication connection between the mobile locker bank 114 and the fixed locker bank 110 via any suitable wireless connection 718 (such as those described herein), which includes a third communication channel and/or physical components for connecting the mobile locker bank 114 to the fixed locker bank 110, as described above. This allows the mobile locker bank 114 and the fixed locker bank 110 to operate as a unified locker bank. For example, a user submitting a request via a mobile computing device 116 (e.g., a smart phone) to deposit an item into a locker at the location of the mobile locker bank 114 and/or the fixed locker bank 110 may be presented with a graphical display of the available lockers within both the mobile locker bank 114 and the fixed locker bank 110. In various embodiments, the display may indicate which lockers are part of the mobile locker bank 114 and which lockers are part of the fixed locker bank 110. In particular embodiments, the display may simply indicate which lockers are available without differentiating between the mobile locker bank 114 and the fixed locker bank 110.

In receiving the request from the user, the mobile computing device 116 may open a wireless communication connection directly with the mobile locker bank 114 via a fourth communication channel 720 and/or a wireless communication channel with the fixed locker bank 110 via a fifth communication channel 722. In particular embodiments, the mobile computing device 116 may, instead, communicate with the one or more servers 104 via a sixth communication channel 724 in order to submit the request and/or to access a database containing the unified locker bank information such as configuration, capacity information, etc. In various embodiments, the user may also use either the fixed locker bank computer 108 or the mobile locker bank computer 112 to request to deposit an item within either the fixed locker bank 110 or the mobile locker bank 114.

In various embodiments, a user (e.g., a delivery driver) may arrive at a location to deposit a parcel with both a fixed locker bank 110 and a mobile locker bank 114. The delivery driver may then use the locker bank computer 108 to deliver the parcel by, for example, using the locker bank computer 108 to request to deliver the parcel (e.g., by scanning a machine-readable indicia associated with the parcel using a machine-readable indicia scanner at the locker bank computer 108). The system (e.g., the one or more servers 104) may then determine that there is an available locker in the mobile locker bank 114. The locker bank computer 108 may then cause the available locker to open (e.g., by disengaging a locking mechanism associated with the locker). The driver can then place the parcel in the locker.

Suitable systems and methods that may be used for conveying a parcel to a locker bank are described in detail in U.S. patent application Ser. No. 14/514,000, which was filed on Oct. 14, 2014 and entitled "Systems and Methods for Conveying a Parcel to a Consignee, for Example, After an Unsuccessful Delivery Attempt", and which is hereby incorporated herein by reference in its entirety. Moreover, suitable systems and methods that may be used for confirming the identity of a user at a locker bank (e.g., such as a user retrieving a parcel from the locker bank) are described in detail in U.S. patent application Ser. No. 14/514,276, which was filed on Oct. 14, 2014 and entitled "Systems and Methods for Confirming an Identity of an Individual, for example, at a Locker Bank", and which is hereby incorporated herein by reference in its entirety. Finally, suitable systems and methods that may be used for facilitating the opening of an appropriately sized locker at a locker bank are described in detail in U.S. patent application Ser. No. 14/514,155, which was filed on Oct. 14, 2014 and entitled "Systems and Methods for Facilitating Delivery of a Parcel to Suitably-Sized Locker", and which is hereby incorporated herein by reference in its entirety.

CONCLUSION

Many modifications and other embodiments of the invention will come to mind to one skilled in the art to which this invention pertains having the benefit of the teachings presented in the foregoing descriptions and the associated drawings. While examples discussed above cover the use of various embodiments in the context of expanding the capacity of a fixed locker bank, various embodiments may be used in any other suitable context. For example, particular embodiments of the system may be utilized in expanding the capacity of a mobile locker bank. Therefore, it is to be understood that the invention is not to be limited to the specific embodiments disclosed and that modifications and other embodiments are intended to be included within the scope of the appended claims. It should also be understood that, although various events are described above as occurring "in response to" certain triggering occurrences, those events may occur in response to only those occurrences or a combination of the triggering occurrences and other occurrences. Although specific terms are employed herein, they are used in a generic and descriptive sense only and not for the purposes of limitation.

What is claimed is:

1. A locker bank system comprising:
   a. a first fixed-position locker bank positioned at a second location, the first fixed-position locker bank comprising:
      i. a plurality of fixed-position locker bank lockers, each of the fixed-position locker bank lockers comprising a housing defining: (1) an interior storage portion that is accessible through an opening in the housing, (2) a door that is moveably mounted to the housing and moveable between (a) a first position, in which the door is positioned to prevent access to the interior storage portion through the opening, and (b) a second position, in which the door is positioned to permit access to the interior storage portion through the opening;

ii. a locking system that is adapted to, for each respective one of the plurality of lockers of the fixed-position locker bank, selectively lock the respective locker's door in the first position;

iii. a first computing system comprising:
at least one first computer processor;
a first memory operatively coupled to the at least one first computer processor;
a first user interface operatively coupled to the at least one first computer processor, the first user interface for receiving information from, and for communicating information to, a user, wherein:
the first computing system is adapted to control access to the respective interior storage portions of the plurality of fixed-position locker bank lockers based on input received via the first user interface;

b. a mobile locker bank comprising:
i. a plurality of mobile locker bank lockers, each of the mobile locker bank lockers comprising:
a locker housing defining:
an interior item storage portion that is accessible through an opening in the locker housing,
a locker door that is moveably mounted to the locker housing and is moveable between
(a) a first position, in which the locker door is positioned to prevent access to the locker housing's interior item storage portion through the opening in the locker housing, and
(b) a second position, in which the locker door is positioned to permit access to the interior item storage portion through the opening in the locker housing; and ii. a mobile locker locking system that is adapted to, for each respective one of the plurality of lockers of the mobile locker bank, selectively lock the respective locker's door in the first position;

iii. a second computing system comprising:
at least one second computer processor;
a second memory operatively coupled to the at least one second computer processor;
wherein the second computing system is adapted to control access to the respective interior storage portions of the mobile locker bank lockers; and c. a communications system that is adapted to facilitate communications between the first computing system and the second computing system when the mobile locker bank is positioned at the second location so that the first fixed-position locker bank and the mobile locker bank function as a single, combined locker bank, wherein the locker bank system is configured to:
i. instruct the user to move a parcel from one of the plurality of mobile locker bank lockers to one of the plurality of lockers in the first fixed-position locker bank located at the second location; and
ii. update information associated with the parcel to include information regarding the one of the plurality of lockers that the parcel was moved into.

2. The locker bank system of claim 1, wherein the second computing system further comprises a second user interface operatively coupled to the at least one second computer processor, the second user interface adapted for receiving information from, and for communicating information to, the user.

3. The locker bank system of claim 2, wherein the user can request release of an item stored in the first fixed-position locker bank using the second user interface.

4. The locker bank system of claim 1, wherein when a request is made to place an item into the fixed-position locker bank, a search is performed of the plurality of lockers within the first fixed-position locker bank and the plurality of lockers within the mobile locker bank to find an available locker.

5. The locker bank system of claim 1, wherein the user can request release of an item stored in the mobile locker bank using the first user interface.

6. The locker bank system of claim 1, wherein the communication system comprises a wired connection between the first fixed-position locker bank and the mobile locker bank that, when connected, serves to enable communication between the first computing system and the second computing device.

7. The locker bank system of claim 1, wherein the communication system comprises a wireless connection that, when connected, serves to enable communication between the first computing system and the second computing system.

8. The locker bank system of claim 7, wherein the wireless connection is via a cellular network.

9. The locker bank system of claim 7, wherein the wireless connection is a BLUETOOTH communication connection between the first computing system and the second computing system.

10. The locker bank system of claim 1, further comprising a second fixed-position locker bank positioned at a third location, the second fixed-position locker bank comprising:
i. another plurality of fixed-position locker bank lockers, each of the another plurality of fixed-position locker bank lockers comprising a housing defining: (1) another interior storage portion that is accessible through an opening in the housing, (2) another door that is moveably mounted to the housing and moveable between (a) another first position, in which the door is positioned to prevent access to the interior storage portion through the opening, and (b) another second position, in which the door is positioned to permit access to the interior storage portion through the opening;

ii. another locking system that is adapted to, for each respective one of the another plurality of fixed-position locker bank lockers of the second fixed-position locker bank, selectively lock the respective locker's door in the another first position;

iii. a third computing system comprising:
i. at least one third computer processor;
ii. third memory operatively coupled to the at least one third computer processor;
iii. a third user interface operatively coupled to the at least one third computer processor, the third user interface for receiving information from, and for communicating information to, the user, wherein:
the third computing system is adapted to control access to the respective interior storage portions of the another plurality of fixed-position locker bank lockers based on input received via the third user interface, wherein when the mobile locker bank is moved from the second location to the third location, the communication system is adapted to facilitate communication between the second computing system and the third computing system so that the second fixed-position locker bank and the mobile locker bank function as another single, combined locker bank.

11. The locker bank system of claim 10, wherein when the mobile locker bank is moved from the second location to the third location, the locker bank system is configured to update each package level data associated with each respective parcel stored in a locker in the mobile locker bank to include information associated with the first fixed-position locker bank located at the second location.

12. A locker bank system comprising:
  a. a first fixed-position locker bank positioned at a first location comprising:
    i. a plurality of first fixed-position locker bank lockers, each of the first fixed-position locker bank lockers comprising a compartment having an opening and a door mounted to the compartment that is moveable between a first open position and a second closed position to prevent access to the compartment through the opening;
    ii. a first locking system that is adapted to, for each respective one of the plurality of lockers of the first fixed-position locker bank, selectively lock the respective locker's door in the closed position;
    iii. a first computing system, comprising:
      a first at least one computer processor;
      first memory operatively coupled to the first at least one computer processor;
      a first user interface for receiving information from, and communicating information to, a user, wherein:
        the first computing system is adapted to control access to each respective compartment of the first fixed-position locker bank plurality of lockers based on input received via the first user interface;
  b. a mobile locker bank comprising:
    i. a plurality of mobile locker bank lockers, each of the mobile locker bank lockers comprising a compartment having an opening and a door mounted to the compartment that is moveable between a first open position and a second closed position to prevent access to the compartment through the opening; and
    ii. a mobile locker bank locking system that is adapted to, for each respective one of the plurality of lockers of the mobile locker bank, selectively lock the respective locker's door in the closed position;
    iii. a plurality of wheels that are operatively connected to the mobile locker bank to facilitate movement of the mobile locker bank between the first location and a second location;
    iv. a second computing system, comprising a second at least one computer processor and memory operatively coupled to the second at least one computer processor, wherein the second computing system is adapted to control access to each respective compartment of the mobile locker bank plurality of lockers; and
  d. a communications system that is adapted to facilitate communications between the first computing system and the second computing system so that, when the mobile locker bank is positioned at the first location, the first fixed position locker bank and the mobile locker bank cooperate to function as a single locker bank,
  wherein the locker bank system is configured to:
    i. instruct the user to move a parcel from one of the plurality of mobile locker bank lockers to one of the plurality of lockers in the first fixed-position locker bank located at the first location; and
    ii. update information associated with the parcel to include information regarding the one of the plurality of lockers that the parcel was moved into.

13. The locker bank system of claim 12, wherein the communication system comprises a wired connection between the first fixed-position locker bank and the mobile locker bank so that the first computer can communicate with the second computer.

14. The locker bank system of claim 12, wherein the communication system comprises a wireless connection that, when connected, serves to connect the first computing system with the second computing system.

15. A mobile locker bank expansion system comprising a mobile locker bank comprising:
  a. a first plurality of lockers, each of the lockers comprising a locker housing defining:
    i. an interior storage portion that is accessible through an opening in the locker housing,
    ii. a locker door that is mounted to move between
      a closed position, in which the locker door is positioned to prevent access to the locker housing's interior storage portion through the opening in the locker housing, and
      an open position, in which the locker door is positioned to permit access to the interior storage portion through the opening in the locker housing;
  b. a first locking system that is adapted to, for each particular one of the first plurality of lockers, selectively lock the particular locker's door in the closed position;
  c. a plurality of wheels that are operatively connected to the mobile locker bank for facilitating movement of the mobile locker bank from a first location to a second location;
  d. a first computing system, comprising at least one computer processor and memory operatively coupled to the at least one computer processor, the computing system being adapted to control access to the respective interior storage portions of each of the first plurality of lockers via the locking system; and
  e. a first communication system that is operatively coupled to the first computing system,
  wherein:
    when the mobile locker bank is positioned at a first location at which a first fixed-position locker bank is located, the first fixed position locker bank having a second plurality of lockers and a second computing system, the communication system being adapted to allow the first computing system to either directly or indirectly communicate with the second computing system so that the first plurality of lockers and the second plurality of lockers function as a single plurality of lockers,
  wherein the mobile locker bank expansion system is configured to:
    i. instruct the user to move a parcel from one of the plurality of mobile locker bank lockers to one of the plurality of lockers in the first fixed-position locker bank located at the first location; and ii. update information associated with the parcel to include information regarding the one of the plurality of lockers that the parcel was moved into.

16. The mobile locker bank expansion system of claim 15, further comprising a first fixed locker bank positioned at the first location comprising:
   a. a second plurality of lockers, each of the lockers of the second plurality of lockers comprising a compartment having an opening and a door mounted to the compartment that is moveable between a first open position and a second closed position to prevent access to the compartment through the opening;
   b. a second locking system that is adapted to, for each respective one of the second plurality of lockers, selectively lock the respective locker's door in the closed position;
   c. the second computing system, comprising:
      a second at least one computer processor;
      second memory operatively coupled to the second at least one computer processor;
      a first user interface for receiving information from, and communicating information to, a user, wherein:
         the second computing system is adapted to control access to each respective compartment of the second plurality of lockers based on input received via the first user interface,
   d. a second communication system that is operatively coupled to the second computing system,
   wherein:
      when the mobile locker bank is positioned at the first location, the first communication system and the second communication system allow the first computer system to either directly or indirectly communicate with the second computer system.

17. The mobile locker bank expansion system of claim 14, wherein the first communication system and the second communication system use one of a wired or a wireless connection to communicate with one another.

18. The mobile locker bank expansion system of claim 17, further comprising a server positioned at a third location, wherein the first computing system communicates with the second communication system via the server.

19. A method of selectively expanding the inventory of a fixed-position locker bank, the method comprising:
   a. monitoring a number of available lockers at a first fixed-position locker bank positioned at a first location;
   b. in response to determining that the number of available lockers at the first fixed-position locker has or will drop below a first predetermined threshold level, wherein the threshold is greater than zero, routing a mobile locker bank to the first location; and
   c. facilitating communication between the mobile locker bank and the first fixed-position locker bank when the mobile locker bank is at the first location, allowing users to access a locker of the mobile locker bank via a user interface on the first fixed-position locker bank.

20. The method of claim 19, wherein when a request is made to place an item into a particular one of the lockers in the first fixed-position locker bank, a search for an available locker is conducted of a first plurality of lockers within the first fixed-position locker bank and a second plurality of lockers within the mobile locker bank.

21. The method of claim 19, wherein a user can request release of an item stored in a particular locker of the mobile locker bank using a user interface operatively coupled to the first fixed-position locker bank.

22. The method of claim 19, wherein a user can request release of an item stored in a particular locker of the first fixed-position locker bank from a user interface operatively coupled to the mobile locker bank.

23. The method of claim 19, wherein communication between the mobile locker bank and the first fixed-position locker bank further comprises a wired connection.

24. The method of claim 19, wherein communication between the mobile locker bank and the first fixed-position locker bank further comprises a wireless connection.

25. The method of claim 19, wherein the method further comprises:
   a. monitoring a number of available lockers at a second fixed-position locker bank positioned at a second location;
   b. at least partially in response to determining that the number of available lockers at the second fixed-position locker bank has or will drop below a second predetermined threshold level, routing the mobile locker bank from the first location to the second location; and
   c. facilitating communication between the mobile locker bank and the second fixed-position locker bank when the mobile locker bank is at the second location so that users may access a locker of the mobile locker bank via a user interface on the second fixed-position locker bank.

26. The method of claim 19, further comprising loading the mobile locker bank with one or more parcels prior to routing the mobile locker bank to the first location.

27. The method of claim 26, further comprising:
   a. retrieving the one or more parcels from the mobile locker bank by at least one of a driver and agent; and
   b. delivering the one or more parcels by the at least one of the driver and agent to a destination.

28. A method of selectively expanding the inventory of a fixed-position locker bank, the method comprising:
   a. determining at one or more computing devices a number of parcels that shall be delivered to a first fixed-position locker bank at a first location over a time period;
   b. monitoring by the one or more computing devices a number of available lockers at the first fixed-position locker bank positioned at the first location;
   c. in response to determining the number of parcels to be delivered and monitoring the number of available lockers at the first fixed-position locker bank, calculating an amount of lockers needed to hold all parcels;
   d. if the amount of lockers exceed a total number of lockers at the first fixed-position locker bank, routing a mobile locker bank to the first location; and
   e. facilitating communication between the mobile locker bank and the first fixed-position locker bank when the mobile locker bank is at the first location so that users may access a locker of the mobile locker bank via a user interface on the first fixed-position locker bank.

29. The method of claim 28, wherein the time period is one or more days.

30. The method of claim 28, wherein when a request is made to place an item into a particular one of the lockers in the first fixed-position locker bank, a search for an available locker is conducted of a first plurality of lockers within the first fixed-position locker bank and a second plurality of lockers within the mobile locker bank.

31. The method of claim 28, wherein communication between the mobile locker bank and the first fixed-position locker bank further comprises a wired connection.

32. The method of claim 28, wherein communication between the mobile locker bank and the first fixed-position locker bank further comprises a wireless connection.

33. The method of claim 28, further comprising loading the mobile locker bank with one or more parcels prior to routing the mobile locker bank to the first location.

34. The method of claim 33, further comprising:
   a. retrieving the one or more parcels from the mobile locker bank by at least one of a driver and agent; and
   b. delivering the one or more parcels by the at least one of the driver and agent to a destination.

35. The method of claim 34, further comprising providing an access code to the at least one of the driver and agent, wherein the access code enables the at least one of the driver and agent to gain access to one or more lockers in the mobile locker bank.

36. The method of claim 33, further comprising sending a notification to a consignee to retrieve a parcel from the mobile locker bank, wherein the notification indicates the first location of the mobile locker bank and includes an access code for the consignee to gain access to a specific locker holding the parcel at the mobile locker bank.

37. The method of claim 28, further comprising loading a specific locker in the mobile locker bank with several parcels prior to routing the mobile locker bank to the first location, wherein each of the several packages are addressed to a different destination or consignee.

38. The method of claim 37, further comprising:
   a. retrieving at least a portion of the several parcels from the mobile locker bank by at least one of a driver and agent; and
   b. delivering the at least the portion of the several parcels by the at least one of the driver and agent to destinations or consignees.

39. The locker bank system of claim 1, wherein the mobile locker bank is moved from the second location to a third location.

40. The locker bank system of claim 1, wherein the third location includes a second fixed-position locker bank.

41. A locker bank system comprising:
   a. a first fixed-position locker bank positioned at a second location, the first fixed-position locker bank comprising:
      i. a plurality of fixed-position locker bank lockers, each of the fixed-position locker bank lockers comprising a housing defining: (1) an interior storage portion that is accessible through an opening in the housing, (2) a door that is moveably mounted to the housing and moveable between (a) a first position, in which the door is positioned to prevent access to the interior storage portion through the opening, and (b) a second position, in which the door is positioned to permit access to the interior storage portion through the opening;
      ii. a locking system that is adapted to, for each respective one of the plurality of lockers of the fixed-position locker bank, selectively lock the respective locker's door in the first position;
      iii. a first computing system comprising:
         at least one first computer processor;
         a first memory operatively coupled to the at least one first computer processor;
         a first user interface operatively coupled to the at least one first computer processor, the first user interface for receiving information from, and for communicating information to, a user, wherein:
            the first computing system is adapted to control access to the respective interior storage portions of the plurality of fixed-position locker bank lockers based on input received via the first user interface;
   b. a mobile locker bank comprising:
      i. a plurality of mobile locker bank lockers, each of the mobile locker bank lockers comprising:
         a locker housing defining:
            an interior item storage portion that is accessible through an opening in the locker housing,
            a locker door that is moveably mounted to the locker housing and is moveable between
               (a) a first position, in which the locker door is positioned to prevent access to the locker housing's interior item storage portion through the opening in the locker housing, and
               (b) a second position, in which the locker door is positioned to permit access to the interior item storage portion through the opening in the locker housing; and
      ii. a mobile locker locking system that is adapted to, for each respective one of the plurality of lockers of the mobile locker bank, selectively lock the respective locker's door in the first position;
      iii. a second computing system comprising:
         at least one second computer processor;
         a second memory operatively coupled to the at least one second computer processor;
         wherein the second computing system is adapted to control access to the respective interior storage portions of the mobile locker bank lockers;
   c. a communications system that is adapted to facilitate communications between the first computing system and the second computing system when the mobile locker bank is positioned at the second location so that the first fixed-position locker bank and the mobile locker bank function as a single, combined locker bank;
   d. a second fixed-position locker bank positioned at a third location, the second fixed-position locker bank comprising:
      i. another plurality of fixed-position locker bank lockers, each of the another plurality of fixed-position locker bank lockers comprising a housing defining: (1) another interior storage portion that is accessible through an opening in the housing, (2) another door that is moveably mounted to the housing and moveable between (a) another first position, in which the door is positioned to prevent access to the interior storage portion through the opening, and (b) another second position, in which the door is positioned to permit access to the interior storage portion through the opening;
      ii. another locking system that is adapted to, for each respective one of the another plurality of fixed-position locker bank lockers of the second fixed-position locker bank, selectively lock the respective locker's door in the another first position;
      iii. a third computing system comprising:
         at least one third computer processor;
         third memory operatively coupled to the at least one third computer processor;
         a third user interface operatively coupled to the at least one third computer processor, the third user interface for receiving information from, and for communicating information to, the user, wherein:

the third computing system is adapted to control access to the respective interior storage portions of the another plurality of fixed-position locker bank lockers based on input received via the third user interface, wherein prior to the mobile locker bank being moved from the second location to the third location, the locker bank system is configured to:

iii. instruct the user to move a parcel from one of the plurality of mobile locker bank lockers to one of the plurality of lockers in the first fixed-position locker bank located at the second location; and iv. update information associated with the parcel to include information regarding the one of the plurality of lockers that the parcel was moved into; and wherein when the mobile locker bank is moved from the second location to the third location, the communication system is adapted to facilitate communication between the second computing system and the third computing system so that the second fixed-position locker bank and the mobile locker bank function as another single, combined locker bank.

* * * * *

UNITED STATES PATENT AND TRADEMARK OFFICE
CERTIFICATE OF CORRECTION

PATENT NO. : 10,089,808 B2
APPLICATION NO. : 15/608781
DATED : May 30, 2017
INVENTOR(S) : Juan Perez et al.

Page 1 of 1

It is certified that error appears in the above-identified patent and that said Letters Patent is hereby corrected as shown below:

In the Specification

Column 4, Line 54: Please remove "(e.g. Tablet" and replace with --(e.g., tablet--.
Column 10, Line 2: Please remove "BLUTEOOH" and replace with --BLUETOOTH--.
Column 11, Line 29: Please remove "and or" and replace with --and/or--.

Signed and Sealed this
Fourth Day of December, 2018

Andrei Iancu
*Director of the United States Patent and Trademark Office*